United States Patent Office

3,288,660
Patented Nov. 29, 1966

3,288,660
NITROGENOUS BASE COMPOSITION
Earl T. Niles, Danville, Calif., and Beverly H. Seaman, Midland, Mich., assignors to The Dow Chemical Company, Midland, Mich., a corporation of Delaware
No Drawing. Filed Feb. 11, 1963, Ser. No. 258,664
6 Claims. (Cl. 149—36)

This invention relates to compositions of nitrogenous bases and more particularly is concerned with novel double azide salts of nitrogenous bases.

The double azide salts of the present invention consist of well characterized, crystalline, stable, equimolar compositions of the azides of two azide forming nitrogenous bases corresponding to the emplirical formula $X'X^2(N_3)n$ where $X'$ and $X^2$ represent nitrogenous bases, at least one being an organic nitrogen base, and $n$ is an integer ranging from 1 to about 3 and corresponds to the sum of the azide ions normally present in the azide salts of the separate bases. These novel double azide compositions are suitable for use as gas generators.

Of particular interest are the novel double azide salts of a guanidine source material and hydrazine or ammonia. The term guanidine source material as used herein includes guanidine, monoaminoguanidine, diaminoguanidine and triaminoguanidine.

These guanidine source material azide·hydrazine azide or guanidine source material azide·ammonia azide double salts find a particular utility as gas generator additives in solid, hybrid and liquid propellant systems. Additionally, they can be employed as a fuel in NF, BNF and BONF propellant systems and as an oxidizer in BN propellant systems.

Triaminoguanidinium azide·hydrazinium azide double salt (hereinafter referred to as THA) is a preferred species of the present novel composition for use in such propellant systems. This double salt is a well characterized, crystalline composition. Its composition is constant and is independent of the proportions of the components in the reactant mixtures from which it is formed. THA has a higher density than the component azides themselves and the heat of combination from its constituent salts is comparable with the heats of combination for known double slats. It exhibits a relatively low sensitivity to impact thereby rendering it safe to handle. This novel composition is thermally stable; i.e. it does not undergo any substantial degradation up to about 150° C.

In preparing the present novel double azides, two nitrogenous bases each of which is capable of forming a well defined azide salt and, preferably having a high N/C and H/C atomic ratio, are reacted with a source of azide ion $N_3^-$ in a hydrophilic solvent substantially inert to the reactants and double salt reaction product.

The nitrogenous base reactants can be used in free base form or employed in any form which contains the component base. Salts of the bases, e.g., the carbonate, sulfate, the azide itself, or, reactants which provide the base in situ all are satisfactory sources of these reactants.

The azide ion can be obtained directly from hydrazoic acid, or alternatively by employing sodium azide in an acid reaction medium. Conveniently, the azide salts of one or both of the component bases serves as azide ion source.

The solvent, i.e. reaction diluent, can be selected from any of a wide variety of hydrophilic liquids that are inert to the reactants and products at the reaction conditions employed. Ordinarily, the reaction mixture initially is heated to dissolve the reactants and promote the methasis reaction after which the reaction mixture is cooled to precipitate the desired double salt. The overall reaction is continued from about 0.25 to about 4 hours or more, the total time depending on the crystallization rate of the double salt product. The reactant ratios, manner of combining, sequence of reactants addition to the reaction vessel and reactant concentrations are not critical. The lower limit of reactant concentration is determined by operating practicalities and the upper limit is that at which precipitation of the product occurs at the reaction temperature. The reaction is carried out at pressures ranging from subatmospheric to superatmospheric. Ordinarily, the reaction is run at atmospheric pressure.

The preparation of the present novel compositions can be carried out in batch type, cyclic, or continuous methods of operation as is apparent to one skilled in the art. Reactors, receiver vessels, storage vessels, transfer equipment and the like are to be prepared from structural materials that are substantially inert to the reactants and reaction products. The processing equipment is designed to have the necessary structural strength to be operable at the predetermined operating conditions.

Preferably, in preparing a guanidine azide, hydrazinium- or ammonia azide double salt, for example, the initial reactant dissolution and metathesis reaction is carried out at atmospheric pressure at a temperature of from about 0 to about 100° C., usually above about 20° C. and preferably at above about 50° C. until a homogeneous solution is formed followed by cooling to crystallize the double salt. Ordinarily the total reaction period is from about 0.5 to about 3 hours. Reactant ratios of the bases and the azide ion source employed preferably, for most efficient and economic operation is about the stoichiometric molar equivalents based on the individual components, i.e. guanidine base, hydrazine or ammonia and azide ion source. This reaction ordinarily is run in a solvent of lower aliphatic alcohol having from 1 to 3 carbon atoms, water, dimethylformamide, ethylene glycol, hydrazine hydrate, an excess of hydrazine and the like.

Ordinarily, the system and reactants are maintained in substantially anhydrous condition whereby less expensive nitrogen base salts can be employed and the reaction readily goes to completion. Although with the hydrazine hydrate solvent, and with water alone, there is some water accumulation in the system, this is not a deterrent as the product readily can be crystallized from the reaction mass. Alternatively, dehydration of the hydrazine hydrate solvent, if used, by azeotrope formation with the water is feasible.

The following example will serve to further illustrate the present invention but is not meant to limit it thereto.

*Preparation of triaminoguanidiniumazide·hydrazinium azide (THA)*

Tiaminoguanidium sulfate (152 grams-0.5 grammole), hydrazine sulfate (81 grams-0.5 gram-mole), sodium azide (130 grams-2.0 gram-mole) and about 2.5 liters of substantially anhydrous methanol were mixed together in a four liter glass flask. The mixture was refluxed for about 2.5 hours at about 79° C., filtered while hot to remove the precipitated sodium sulfate therefrom and the residual solution refrigerated at about minus 20° C. A crystalline precipitate was obtained from the chilled reaction solution. This precipitated product was separated by filtration, recrystallized from methanol, washed with ethanol and dried under reduced pressure. About 130 grams (58.5% of theoretical yield) of the double azide salt was recovered. This product was identified and characterized as follows.

1. Elemental Analysis:

|  | Percent by weight | | |
| --- | --- | --- | --- |
|  | C | H | N |
| Found | 5.55 | 5.88 | 87.96 |
| Theory ($CH_{14}N_{14}$) | 5.40 | 6.35 | 88.24 |

2. Equivalent weight:
   Found—110.
   Theory—111.1.
3. Density—1.46 grams/cc.
4. Measured heat of formation—$158.9 \pm 1$ K. cal./mole.
5. Impact Sensitivity (50% fire level)—17.5 cm. (2 kg. weight).
6. Solubility:
   Solvent—
   Methanol—3.3 g./100 grams at 22° C.
   Water—soluble.
   Ethanol—slightly soluble.
7. Infrared Absorption

| Group | Wave Length (microns) | Absorption |
| --- | --- | --- |
| NH (stretch) | 3.05 | Strong. |
| Do | 3.1 | Do. |
| Do | 3.15 | Do. |
| $N_3^-$ (stretch) | 4.85 | Do. |
| Do | 4.95 | Do. |
| C–N (stretch) | 6.0 | Do. |
| NH (bend) | 6.15 | Medium. |
| Do | 6.3 | Do. |
| C–N (stretch) | 8.8 | Strong. |
| Do | 8.9 | Do. |
| Do | 9.05 | Do. |
| $NHNH_2$ | 9.98 | Do. |
| $NHNH_2$ | 10.4 | Do. |
| $NHNH_2$ | 10.65 | Medium. |

8. Decomposition $\sim$ 150° C. (break down of crystal lattice).

In a manner similar to that described for the foregoing example, the corresponding double azide salts of azide forming bases are obtained by reacting in an inert solvent, for example, (a) Triaminoguanidine azide and hydrazinium azide,
(b) Guanidine carbonate, hydrazine sulfate, hydrazine and sodium azide,
(c) Guanidine carbonate, hydrazine sulfate, hydrazine hydrate and sodium azide,
(d) Guanidine carbonate, hydrazine, sulfuric acid and sodium azide,
(e) Guanidine carbonate, hydrazine hydrate, sulfuric acid and sodium azide,
(f) Guanidine sulfate, hydrazine carbonate and sodium azide,
(g) Aminoguanidine sulfate, hydrazine carbonate and sodium azide,
(h) Diaminoguanidine sulfate, hydrazine carbonate and sodium azide,
(i) Aminoguanidine sulfate, hydrazine sulfate and sodium azide,
(j) Triaminoguanidine, hydrazine and hydrazoic acid,
(k) Triaminoguanidine, hydrazine hydrate and hydrazoic acid,
(l) Diaminoguanidinium azide and hydrazinium azide,
(m) Cyanamide, hydrazine sulfate, hydrazine and sodium azide,
(n) Triaminoguanidine sulfate, ammonium sulfate and sodium azide.

Various modifications can be made in the present invention without departing from the spirit or scope thereof for it is understood that we limit ourselves only as defined in the appended claims.

We claim:

1. A nitrogeneous base azide composition consisting of the double azide salts of a guanidine source material and a member selected from the group consisting of hydrazine and ammonia, said composition having the empirical formula $X'X^2(N_3)_2$ wherein $X'$ is a guanidine source material selected from the group consisting of guanidine, monoaminoguanidine, diaminoguanidine and triaminoguanidine and $X^2$ is a member selected from the group consisting of ammonia and hydrazine.

2. Triaminoguanidinium azide·hydrazinium azide double salt.

3. A process for preparing double azide salts of two nitrogenous bases each of which is capable of forming a well defined azide salt which comprises;
    (1) providing a mixture of two nitrogenous bases each of which is capable of forming a well defined azide salt, one of said nitrogenous bases being a guanidine source material and the other of said nitrogenous bases being a member selected from the group consisting of hydrazine and ammonia, and a source of azide ion in a hydrophilic solvent that is inert to the reactants and the reaction product,
    (2) reacting said mixture at a temperature of from about 0° C. to about 100° C. for a period of from about 0.25 to about 4 hours, and,
    (3) recovering the double azide salt of said nitrogenous bases from the reaction mass.

4. A process for preparing a double azide salt of two nitrogen bases having a high N/C and H/C ratio which comprises;
    (1) providing a first nitrogenous base guanidine source material selected from the group consisting of guanidine, monoaminoguanidine, diaminoguanidine, triaminoguanidine and salts thereof, a second nitrogenous base material selected from the group consisting of hydrazine and ammonia, and, an azide ion source material,
    (2) dissolving the guanidine source material, second nitrogenous base material, and azide ion source material in a solvent selected from the group consisting of aliphatic alcohols having from 1 to 3 carbon atoms, water, dimethylformamide, ethylene glycol, hydrazine hydrate and hydrazine,
    (3) reacting said mixture at a temperature of from about 20 to about 100° C. for a period of from about 0.5 to about 3 hours, and
    (4) recovering the double azide salt of said guanidine source material and said second nitrogenous base therefrom.

5. A process for preparing triaminoguanidinium azide·hydrazinium azide double salt which comprises;
    (1) providing a solution of triaminoguanidine sulfate, hydrazine sulfate and sodium azide in substantially anhydrous methanol, said triaminoguanidinium sulfate and said hydrazine sulfate being present in substantially equimolar quantities and the concentration of said sodium azide on a gram-mole basis being about twice that of the sum of the gram-moles of said triaminoguanidinium sulfate and said hydrazine sulfate,
    (2) heating said solution for a period of from about 2 to about 3 hours, at a temperature from about 65 to 75° C., (3) directly filtering said solution subsequent to said heating,
(4) cooling said filtered solution thereby to precipitate the crystalline double azide salt product therein, and
(5) recovering the precipitated triaminoguanidinium azide·hydrazinium azide from the residual solution.

6. A process for preparing triaminoguanidinium azide·hydrazinium azide which comprises:
(1) dissolving triaminoguanidinium azide and hydrazinium azide in methanol, and
(2) recovering from the resultant solution triaminoguanidinium azide·hydrazinium azide double salt.

References Cited by the Examiner
UNITED STATES PATENTS

| | | | |
|---|---|---|---|
| 2,768,888 | 10/1956 | Ryker | 149—36 |
| 2,954,283 | 9/1960 | Horvitz | 149—36 |
| 3,219,500 | 11/1965 | Pannell et al. | 149—36 |

BENJAMIN R. PADGETT, *Primary Examiner.*

CARL D. QUARFORTH, REUBEN EPSTEIN,
*Examiners.*

L. A. SEBASTIAN, *Assistant Examiner.*